United States Patent
Yu et al.

(10) Patent No.: US 12,198,367 B2
(45) Date of Patent: Jan. 14, 2025

(54) PORTABLE DIMENSIONAL REFERENCE FOR 3-D TOWER MODELING

(71) Applicant: ATC IP LLC, Boston, MA (US)

(72) Inventors: Jun Yu, Winchester, MA (US); Scarlet DeSaavedra, Lowell, MA (US); Matthew Gulsvig, Eagan, MN (US); Joseph Hanrahan, San Francisco, CA (US); Alden Jones, San Francisco, CA (US)

(73) Assignee: ATP IP LLC, Boston, MA (US)

( * ) Notice: Subject to any disclaimer, the term of this patent is extended or adjusted under 35 U.S.C. 154(b) by 410 days.

(21) Appl. No.: 17/668,652

(22) Filed: Feb. 10, 2022

(65) Prior Publication Data

US 2022/0254049 A1 Aug. 11, 2022

Related U.S. Application Data (60) Provisional application No. 63/147,836, filed on Feb. 10, 2021.

(51) Int. Cl.
*G06T 7/60* (2017.01)
*G06T 17/05* (2011.01)
(Continued)

(52) U.S. Cl.
CPC .............. *G06T 7/60* (2013.01); *G06T 17/05* (2013.01); *B64U 10/14* (2023.01);
(Continued)

(58) Field of Classification Search
CPC ... G06T 7/60; G06T 7/74; G06T 2207/30168; G06T 2207/30204
See application file for complete search history.

(56) References Cited

U.S. PATENT DOCUMENTS

| | | | |
|---|---|---|---|
| 5,511,153 A | 4/1996 | Azarbayejani et al. | |
| 7,398,928 B2 * | 7/2008 | Gaspard ................. | G01C 11/00 235/494 |

(Continued)

FOREIGN PATENT DOCUMENTS

| | | |
|---|---|---|
| CN | 206300651 U | 7/2017 |
| JP | 2005017286 A | 1/2005 |
| KR | 20150000523 U | 2/2015 |

OTHER PUBLICATIONS

Wujek Tester: "DeWalt Tstak DWST82991-1bag", Jan. 11, 2020 (Jan. 11, 2020), XP55949744, URL:https://www.youtube.com/watch?v=pUOHK-ev6jw [retrieved on Aug. 10, 2022] the whole document.

(Continued)

*Primary Examiner* — Christopher P Ellis
(74) *Attorney, Agent, or Firm* — BainwoodHuang (57) ABSTRACT

A portable dimensional reference (PDR) that is transportable to a tower site and deployable on site at ground level near a tower. The PDR includes a pair of target pads and multiple connecting segments, which may be attached end-to-end between the target pads. The target pads are marked with respective targets that enable photogrammetry software to identify the targets, their locations, and the distance between them with high precision, enabling the software to apply the known distance as a scale constraint for accurately scaling dimensions of imaged components of the tower.

5 Claims, 5 Drawing Sheets

(51) Int. Cl.
*B64U 10/14* (2023.01)
*B64U 101/30* (2023.01)

(52) U.S. Cl.
CPC .............................. *B64U 2101/30* (2023.01); *G06T 2207/30204* (2013.01); *G06T 2207/30252* (2013.01)

(56) References Cited

U.S. PATENT DOCUMENTS

| | | | |
|---|---|---|---|
| 9,501,679 B2* | 11/2016 | Doraiswamy | G06K 19/06168 |
| 10,445,895 B2 | 10/2019 | Knorr et al. | |
| 10,665,035 B1* | 5/2020 | Perkins | G06T 7/579 |
| 10,789,441 B2* | 9/2020 | Tu | G06K 19/06037 |
| 2005/0188775 A1 | 9/2005 | Heimer | |
| 2005/0273992 A1 | 12/2005 | Staples et al. | |
| 2008/0295352 A1 | 12/2008 | Brunson | |
| 2018/0041907 A1* | 2/2018 | Terry | H04L 67/75 |
| 2018/0086483 A1* | 3/2018 | Priest | B64U 70/50 |

OTHER PUBLICATIONS

PCT/US2022/015922; Notification of Transmittal of the International Search Report and the Written Opinion of the International Searching Authority, or the Declaration dated Aug. 23, 2022; 67 pages.

Form PCT/ISA/206 Invitation to Pay Additional Fees and Where Applicable Protest Fee dated May 11, 2022, 44 pages.

\* cited by examiner

PORTABLE DIMENSIONAL REFERENCE FOR 3-D TOWER MODELING

BACKGROUND

Tower facilities for broadcast and other wireless technologies (e.g., cellular, microwave, Wi-Fi, etc.) provide essential infrastructure for supporting today's high-speed wireless communications. Owners and operators of towers and equipment installed thereon can benefit from obtaining three-dimensional (3-D) models of towers and associated assets. The 3-D models can assist with resource planning, maintenance, and repairs.

A common approach for generating 3-D models of towers involves the use of a UAS (unmanned aerial system), such as a quadcopter drone, which includes equipment for performing aerial digital photography. For example, a UAS follows a predefined flight plan around a tower, acquiring digital images from various heights and angles. Specialized software running on a ground-based computer analyzes the images and constructs a 3-D tower model.

The resulting tower model may be subject to errors, however. Although the specialized software performs well at estimating dimensions and angles of imaged towers and their components, errors nonetheless arise due to limited optical resolution, limited viewing angles, software rounding errors, and other sources.

To this end, it is common for persons directing the UAS to identify some known length, which the software can anchor to and apply when scaling imaged components. For example, a technician may identify a certain component of the tower, such as a pole or cross piece, measure its length manually, and then enter that length into the software. The software can apply that length as a known reference and then scale measurements of other lengths based on comparison to that reference.

SUMMARY

Unfortunately, prior approaches to providing length references can be inconvenient, error-prone, or even hazardous. For example, making measurements can involve climbing towers or ladders, which requires time, labor, and in some cases involves risks to persons or equipment. Also, technicians can make errors in their measurements. What is needed, therefore, is a more convenient, safe, accurate, and repeatable way of providing a dimensional reference to assist with 3-D tower modeling.

This need is addressed at least in part by a portable dimensional reference (PDR) that is transportable to a tower site and deployable on site at ground level near a tower. The PDR includes a pair of target pads and multiple connecting segments, which may be attached end-to-end between the target pads. The target pads are marked with respective targets that enable photogrammetry software to identify the targets, their locations, and the distance between them with high precision, enabling the software to apply the known distance as a scale constraint for accurately scaling dimensions of imaged components of the tower.

Advantageously, the PDR satisfies the need for a scale constraint in the software. In addition, it does so in a manner that requires little effort or risk on the part of technicians. The PDR is the same size each time it is used, and it may be reused for different towers and at different sites.

In some examples, the connecting segments are provided as separate components that attach together end-to-end along a line, the line terminating at each end in a respective target pad.

According to some examples, the PDR has a length of at least 10 feet (3 meters) and preferably 20 feet (6 meters), as measured from the center of one target pad to the center of the other. According to some examples, each target pad has an area of at least 300 square inches (1935 square centimeters) and preferably 400 square inches (2,580 square centimeters).

According to some examples, the target on each target pad is a high-contrast feature that includes an hourglass pattern having adjacent bright and dark areas.

According to some examples, the target on each target pad is a high-contrast feature that includes a checkerboard pattern having adjacent bright and dark areas.

According to some examples, the target pads are rectangular in shape, such as square, and have at least two turned-down edges configured to securely engage with the ground.

According to some examples, the target pads are rectangular in shape, such as square, and have four feet configured to securely engage with the ground.

In some examples, each of the connecting segments attaches to at least one adjacent connecting segment via a latch, the latch forming a secure and dimensionally stable connection between the two adjacent connecting segments. The latch may be realized, for example, with a buckle latch, a push-and-lock latch, or any other type of latch or connection (including threading) that forms a mechanically and dimensionally stable connection.

In some examples, a carrying bag is provided for storing the target pads and the connecting segments when not in use. The carrying bag includes compartments, straps, and/or sleeves for securely holding the target pads and the connecting segments within the bag.

In some examples, the carrying bag is configured to store components for two PDRs, for a total of four target pads and twice the number of connecting segments as used for a single PDR. In an example, a total of five connecting segments is used in each PDR, such that the carrying bag is configured to hold ten connecting segments.

Some arrangements involve deploying first and second PDRs adjacent to the tower at the tower site. In such arrangements, the software may use the first PDR as a scale constraint, applying that scale constraint in determining tower dimensions for the 3-D model, which may include estimating a length of the second PDR. If the estimated length of the second PDR differs from the length of the first PDR by greater than a threshold, the software may generate an alert to the technician, as the detected disparity between the lengths of the two PDRs may suggest an assembly error when assembling one or both PDRs.

Certain embodiments are directed to a portable dimensional reference (PDR) for photogrammetric analysis. The PDR includes a first target pad having a first target formed thereon, a second target pad having a second target formed thereon, and multiple connecting segments configured to connect end-to-end between the first target pad and the second target pad and to establish a known distance between the first target and the second target.

In some examples, the first target and the second target each have a contrast ratio greater than 5:1.

In some examples, each of the first target and the second target is formed using at least one of (i) paint or (ii) at least one decal.

In some examples, each of the first and second target pads includes a flat region and two turned-down edges extending from the flat region and configured to securely engage with the ground.

In some examples, each of the first and second target pads includes a flat region and four turned-down feet extending from the flat region and configured to securely engage with the ground.

In some examples, each of the first and second targets is substantially square, having a side dimension of at least 10 inches (25.4 cm), and wherein each of the first and second targets reveal or imply a respective visible reference point.

In some examples, the known distance between the first target and the second target is at least 10 feet (3 meters).

In some examples, the connecting segments include a first connecting segment and a second connecting segment. The first connecting segment and the second connecting segment are configured to connect to each other via an adapter that maintains alignment between the first connecting segment and the second connecting segment.

In some examples, the adapter includes a channel joiner or plug that extends within respective portions of the first connecting segment and the second connecting segment and is affixed to the respective portions.

In some examples, the PDR further includes a buckle latch having a first portion attached to the first connecting segment and a second portion attached to the second connecting segment such that, when the buckle latch is engaged, the first connecting segment is held against the second connecting segment.

In some examples, the adapter includes a locking post disposed at an end of the first connecting segment and a locking receptacle disposed at an end of the second connecting segment. The locking post is configured to engage the locking receptacle in a push-and-lock fashion to hold the end of the first connecting segment against the end of the second connecting segment.

In some examples, the connecting segments are coated with a material that has a solar reflective index (SRI) of at least 80% and a thermal emittance of at least 85%.

Other embodiments are directed to a system. The system includes a first PDR including a first target pad having a first target formed thereon, a second target pad having a second target formed thereon, and a first set of multiple connecting segments configured to connect end-to-end between the first target pad and the second target pad to establish a known distance between the first target and the second target. The system further includes a second PDR including a third target pad having a third target formed thereon, a fourth target pad having a fourth target formed thereon, and a second set of multiple connecting segments configured to connect end-to-end between the third target pad and the fourth target pad and to establish a known distance between the third target and the fourth target. The system still further includes a carrying bag that includes (i) respective compartments configured to hold the first through fourth target pads and (ii) respective areas for holding the first set of connecting segments and the second set of connecting segments.

In some examples, the carrying bag is foldable along a line that separates the carrying bag into two regions, the first region including compartments configured to hold the first and second target pads and areas for holding the first set of connecting segments, the second region including compartments configured to hold the third and fourth target pads and areas for holding the second set of connecting segments.

In some examples, the first region of the carrying bag has a first handle portion, the second region of the carrying bag has a second handle portion, and, when the carrying bag is folded along the line, the first handle portion and the second handle portion come together to form a handle of the carrying bag.

Still further embodiments are directed to a method of using one or more portable dimensional references (PDRs). The method includes transporting a carrying bag to a location of a tower, the carrying bag including components of a PDR, the components including a first target pad having a first target formed thereon, a second target pad having a second target formed thereon, and a set of multiple connecting segments configured to connect end-to-end between the first target pad and the second target pad to establish a known distance between the first target and the second target. The method further includes removing the components of the PDR from the carrying bag at the location of the tower, assembling the PDR at least in part by attaching the connecting segments of the set of connecting segments end-to-end between the first target pad and the second target pad at a location within a predetermined distance from the tower, and performing photogrammetric measurements on the tower based at least in part on the known distance established by the PDR.

In some examples, the PDR is a first PDR and transporting the carrying bag to the location of the tower includes transporting components of a second PDR. The components of the second PDR include a third target pad having a third target formed thereon, a fourth target pad having a fourth target formed thereon, and a second set of multiple connecting segments configured to connect end-to-end between the third target pad and the fourth target pad to establish a known distance between the third target and the fourth target.

In some examples, the method further includes removing the components of the second PDR from the carrying bag, assembling the second PDR at a second location within a predetermined distance from the tower by attaching the connecting segments of the second set of connecting segments end-to-end between the third target pad and the fourth target pad, and establishing a length reference based on photogrammetric images of the known distance between the first target and the second target. The method further includes photogrammetrically measuring, based on the length reference, a distance between the third target and the fourth target and alerting an operator of an error in assembling at least one of the first PDR and the second PDR responsive to detecting a mismatch between the measured distance and the known distance.

In some examples, photogrammetrically measuring the distance between the third target and the fourth target is performed by a computer based on photographic images acquired by a camera of an unmanned aerial vehicle that flies around the tower.

In some examples, assembling the PDR includes straightening the PDR so that the first target pad, the first set of connecting segments, and the second target pad all form a line on a common plane.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique includes providing a portable dimensional reference (PDR) that is transportable to a tower site and deployable on site at ground level near a tower. The PDR includes a pair of target pads and multiple connecting segments, which may be attached end-to-end between the target pads. The target pads are marked with respective targets that enable photogrammetry software to identify the targets, their locations, and the distance between them with high precision, enabling the software to apply the known distance as a scale constraint for accurately scaling dimensions of imaged components of the tower.

Figure 1:
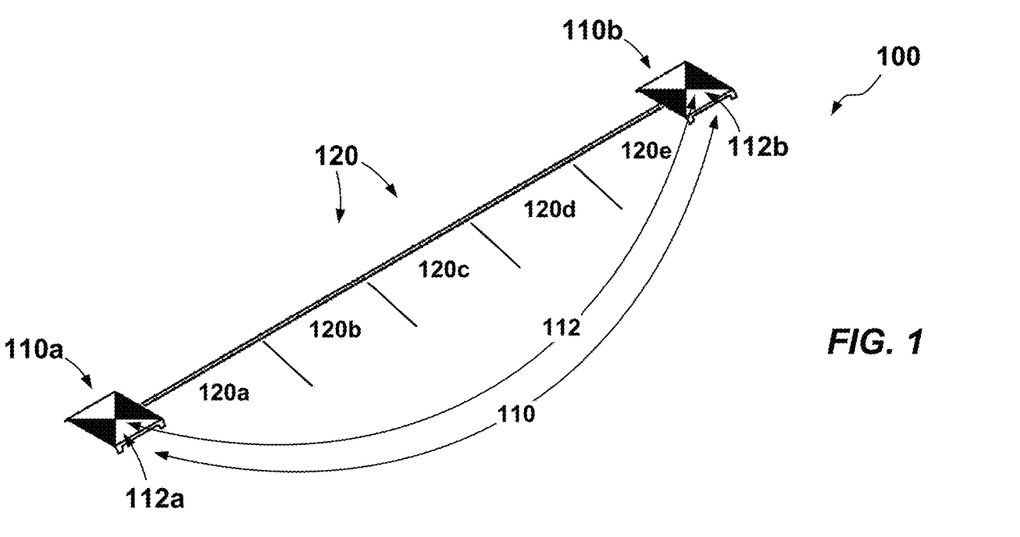
FIG. 1 is an elevated view of an example portable dimensional reference (PDR) in accordance with certain embodiments.

FIG. 1 shows an example PDR 100 in accordance with the improvements disclosed herein. As shown, the PDR 100 includes first and second target pads 110a and 110b (collectively, 110), as well as multiple connecting segments 120a-120e (collectively, 120) connected end-to-end between the target pads 110a and 110b. For example, target pad 110a connects to connecting segment 120a, which connects end-to-end with connecting segment 120b. Connecting segment 120b connects end-to-end with connecting segment 120c. Likewise, connecting segment 120c connects end-to-end with connecting segment 120d, which connects end-to-end with connecting segment 120e. Connecting segment 120e connects to target pad 110b.

Each of the target pads 110 has a respective target 112 formed thereon (i.e., target 112a or 112b). For example, each target 112 may be painted onto a respective target pad 110. Alternatively, one or more decals may be applied, or some other surface treatment may be used. The targets 112 are preferably high-contrast features, e.g., features with contrast ratios of at least 5:1 and preferably 10:1 or higher, where "contrast ratio" is defined as the luminance of the brightest areas of the targets to the luminance of the darkest areas. Rendering the targets 112 with high contrast promotes accurate photogrammetry by ensuring that targets can be clearly imaged in photographs under a variety of weather and ground conditions.

In the example shown, each target 112 has an hour-glass shape. Alternatively, a checkerboard shape may be used, such as one having two black squares and two white squares, where like-colored squares touch only at their corners. However, any shape that clearly reveals or implies a reference point may be used.

A "reference point" refers to a point on a target 112 that can be photogrammetrically located with high accuracy and that can form the basis of a length measurement. In the example shown, each target 112 has a reference point at the center of the respective hourglass, where the apexes of the depicted triangles meet (see reference point 610 in FIG. 6). Reference points need not appear as directly marked features, however, as long as they can be accurately determined. For example, circular rings may accurately imply center points that may be used as reference points, even though such center points may be rendered with the same color and brightness as surrounding areas.

For the PDR 100 to be useful in photogrammetry applications, the distance between reference points on targets 112a and 112b must be precisely known. In an example, the PDR 100 is constructed such that the linear distance between reference points on the two targets 112 is precisely 20 feet (6 meters). PDRs with different spacing may be used, including those with reference points separated by as little as 10 feet (3 meters), provided that the separation is precisely known. Empirical results indicate that an error of 0.15% in distance between reference points yields acceptable results. Given that the PDR 100 is preferably a modular device that is assembled on-site, e.g., at the location of a tower, tight and secure connections between components and proper alignment of components are critical for achieving the desired precision.

Figure 2:
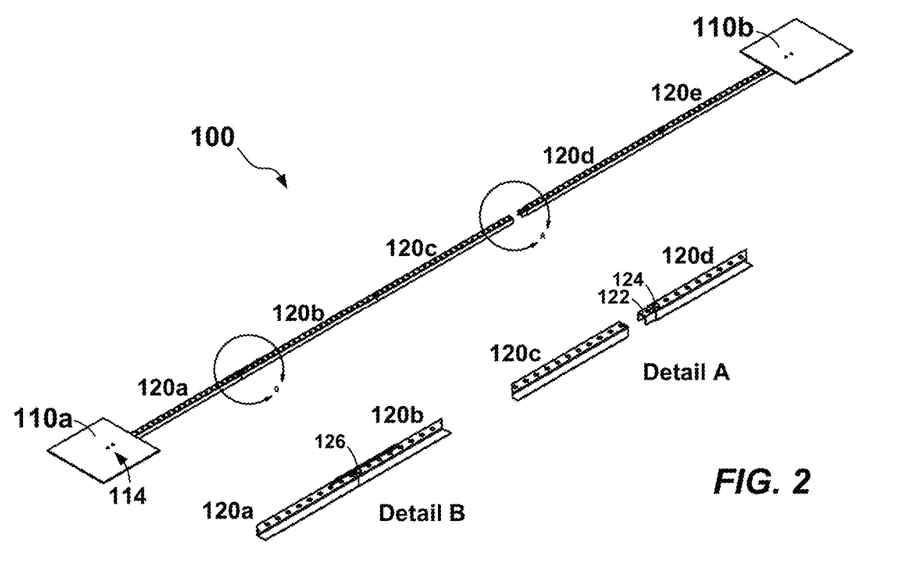
FIG. 2 is an elevated view of another example PDR, which shows a first example latching arrangement for attaching connecting segments.

FIG. 2 shows a first example arrangement for attaching adjacent segments 120. Here, connecting segments 120 are formed from perforated U-shaped channels having holes at regular intervals. In this arrangement, first and last segments 120a and 120e may connect, respectively, to target pads 110a and 110b using nuts and bolts or other temporary fasteners. The fasteners may be "temporary" to allow the PDR 100 to be disassembled later. For example, one may connect segment 120a to the target pad 110a by passing bolts through holes at the end of the segment 120a and through holes 114 in the target pad 110a, applying nuts to hold the bolts firmly in place. As holes 114 are arranged in a line that points in the direction of the second target pad 110b, the placement of holes 114 ensures that the segment 120a extends away from the target pad 110a at the proper angle. A similar arrangement may be provided for attaching segment 120e to target pad 110b.

As shown in Detail A of FIG. 2, channel joiners 122 may be used to connect adjacent segments 120. For example, the channel joiners 122 are slightly narrower than the U-shaped channels and fit within them. Holes within the channel joiners 122 may have the same spacing as holes within the U-shaped channels, allowing fasteners to join U-shaped channels together end-to-end, e.g., using nuts and bolts or other temporary fasteners. For example, a channel joiner 122 may extend within respective portions at the ends of segments 120c and 120d, and the channel joiner 122 may be affixed to the respective portions. As the channel joiner 122 extends into the portions of both channels 120c and 120d (one hole location in the depicted example), it naturally tends to align the two channels. In addition, any play or slack between adjacent segments 120 may be reduced by straps 126. As shown in Detail B, rubber tarp straps may be used to hold adjacent segments 120 tightly together. It should be clear that any segment 120 may occupy any location within the PDR 100. Thus, the segments 120 are interchangeable.

Figure 3A:
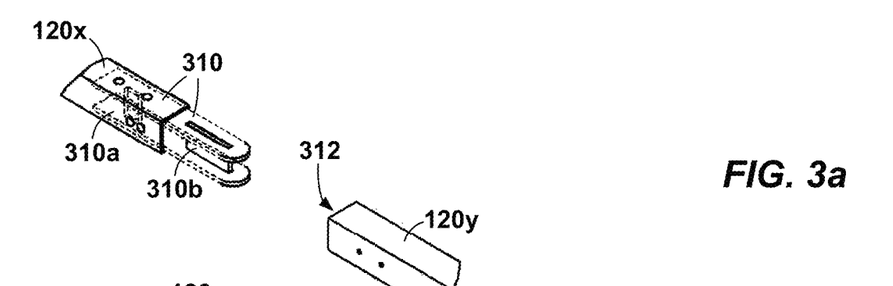
FIGS. 3a-3c are respective views of a second example latching arrangement for attaching connecting segments.
Figure 3B:
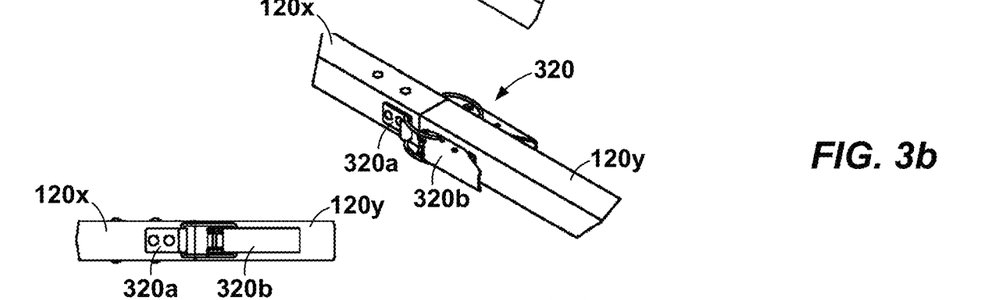
Figure 3C:
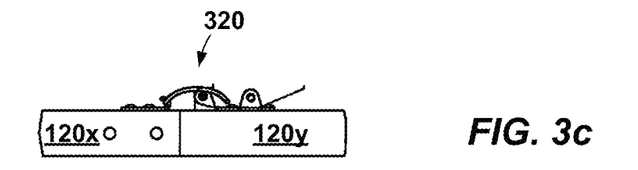

FIGS. 3a-3c show a second example arrangement for attaching adjacent segments 120. As shown in FIG. 3a, segments 120x and 120y may be formed from U-shaped channels or square tubes, for example. The two segments 120x and 120y are preferably identical, but the two ends of each segment 120 are configured differently. One end is shown as part of segment 120x and has a plug 310. The other end is shown as part of segment 120y and has a receptacle 312. In an example, the plug 310 includes a first portion 310a that extends inside the segment (e.g., 120x) and is permanently affixed thereto, e.g., by welding. A second portion 310b extends outside the segment 120x and is adapted to fit inside a receptacle 312, such as the receptacle 312 of segment 120y.

As shown in FIGS. 3b and 3c, buckle latches 320 may be provided to firmly hold adjacent segments together. In some arrangements, two buckle latches 320 are used for each attachment (FIG. 3b). In other arrangements, only a single buckle latch is used (FIG. 3c). Each buckle latch 320 has a first portion 320a attached to the end of a first segment (e.g., 120x) and a second portion 320b attached to the end of a second segment (e.g., 120y). When the buckle latch 320 is engaged, the first portion 320a and the second portion 320b are drawn together, causing the first segment to be held against the second segment. The resulting tight attachment assists the PDR 100 in achieving the desired precision of overall length between targets 112. It also helps to maintain proper alignment between connected segments.

Although not shown in FIGS. 3a-3c, one should appreciate that target pads 110a and 110b may be configured differently from each other. For example, target pad 110a may have a plug 310 extending therefrom that resembles the plug 310 shown at the pictured end of segment 120x. Likewise, target pad 110b may have a receptacle 312 configured to receive a plug 310, e.g., a plug that extends from the last segment 120e. In this manner, any segment 120 can be used in any location, i.e., the segments 120 are interchangeable.

Figure 4A:
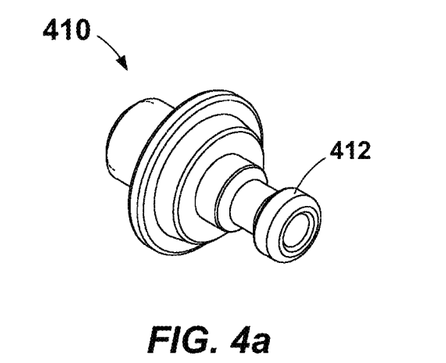
FIGS. 4a and 4b are respective views of a third example latching arrangement for attaching connecting segments.
Figure 4B:
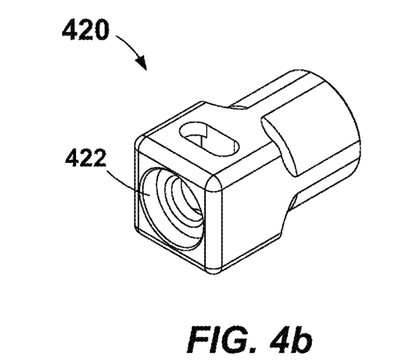

FIGS. 4a and 4b show a third example arrangement for attaching adjacent segments 120. Here, the segments 120 are assumed to have a round cross section, i.e., the segments 120 are provided as poles, such as round tubes. As before, the two ends of each segment 120 have different terminations. In this example, a male adapter 410 (FIG. 4a) is provided at one end of each pole and includes a locking post 412, which is constructed and arranged to mate with a locking receptacle 422 formed within a female adapter 420 of an adjacent pole (FIG. 4b). The locking post 412 and the locking receptacle 422 attach together in a push-and-lock manner. Target pads 110 may use adapters 410 and 420 for attaching to segments 120. For example, the target pad 110a may include a male adapter 410 for attaching to a female adapter 420 in the first segment 120a. Likewise, the target pad 110b may include a female adapter 420 for attaching to a male adapter in the last segment 120e.

Figure 5:
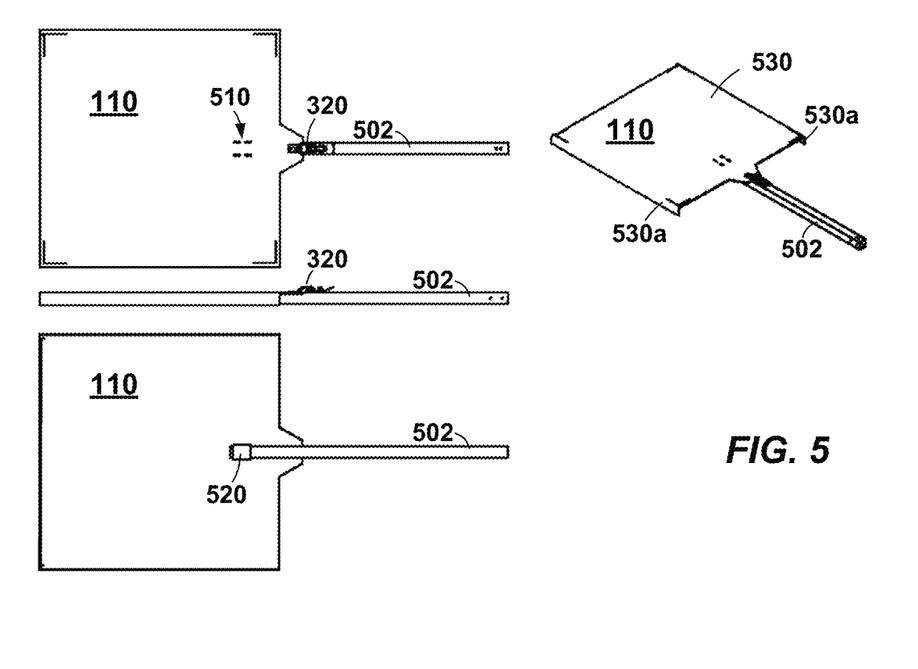
FIG. 5 shows various views of an example target pad.

FIG. 5 shows an example target pad 110 in additional detail. Here, the target pad 110 is connected to an adapter 502 via a buckle clamp 320. The buckle clamp 320 includes a first portion 320a affixed to the target pad 110 and a second portion 320b affixed to the adaptor 502 (see also FIGS. 3a-3c). The first portion 320a and the second portion 320b may be engaged together to hold the adapter 502 tightly against the target pad 110. The adapter 502 is configured to connect to a segment 120 and may be similar in design to the segments 120, e.g., it may be formed from the same stock material, such as a square tube or U-shaped channel. Also, the adapter 502 may attach to segments 120 the same way that the segments 120 attach to each other.

In an example, the adapter 502 extends past the buckle clamp 320 and along the underside of the target pad 110, where it is held in place using a strap 520. The strap 520 may be connected to the target pad 110 via holes 510 and associated fasteners, such as U-bolts, for example. In addition to securing the adapter 502, the strap 520 also prevents rotation of the adapter 502 relative to the target pad 110, thus promoting accuracy and repeatability of distances between targets 112 on respective target pads 110.

The arrangement of FIG. 5 uses a buckle clamp 320 for attaching the target pad 110 to the adapter 502. Alternatively, the adapter 502 may be attached using channel joiners (FIG. 2) or using push-and-lock connectors (FIGS. 4a and 4b), for example. The example shown is intended to be illustrative rather than limiting.

As best seen in the perspective view to the upper-right of FIG. 5, the target pad 110 includes a flat region 530 and a pair of turned-down edges 530a extending from the flat region 530. The turned-down edges 530a are configured to securely engage with the ground. For example, the turned-down edges 530a can settle into grass, dirt, snow, and the like and thereby resist movement of the target pad 110 once it is placed on the ground.

Figure 6:
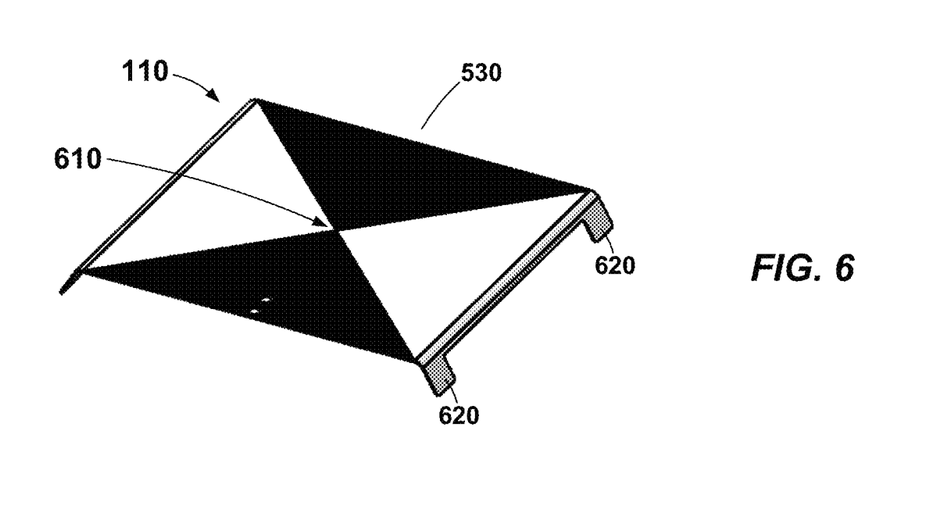
FIG. 6 is a perspective view of an example target pad.

FIG. 6 shows additional features of an example target pad 110. In this example, the target pad 110 includes a flat region 530 and four turned-down feet 620 extending from the flat region and configured to securely engage with the ground.

Also shown in FIG. 6 is an example reference point 610, seen here as the point where the apexes of the four triangles the form the hourglass image meet. The reference point 610 provides an effective basis for distance measurements, i.e., measurements of distance between targets 112 on respective target pads 110. Not only is the reference point 610 easily imaged by cameras, but also the surrounding features clearly imply the reference point 610, such that the location of the reference point 610 can be precisely determined algorithmically even if there is noise in acquired images, and even if debris, such as grass, dirt, snow, and the like, covers the reference point 610.

Figure 7:
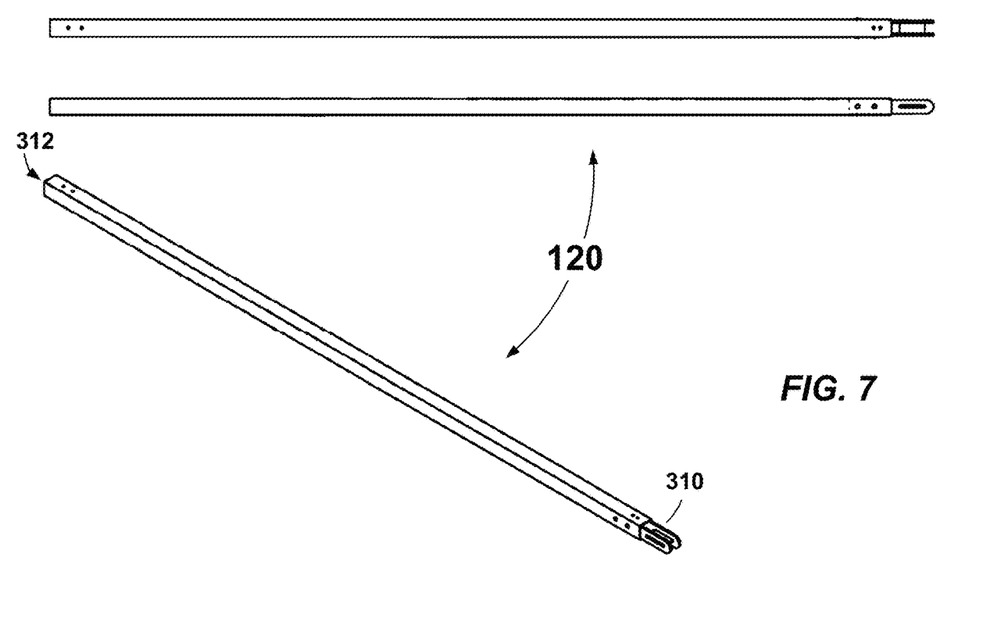
FIG. 7 shows various views of an example connecting segment, e.g., of the type shown in FIGS. 3a-3c.

FIG. 7 shows various views of an example segment 120 in additional detail. Here, the illustrated segment 120 corresponds to those shown in FIGS. 3a-3c, which include plugs 310 and receptacles 312 which enable segments 120 to be joined together end-to-end.

Figure 8:
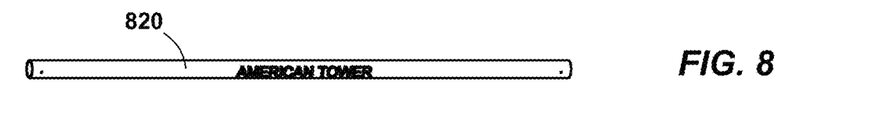
FIG. 8 is a front plan view of another example connecting segment.

FIG. 8 shows an example segment 820 realized as a pole having a round cross-section. For example, segment 820 may be used in embodiments that use push-and-lock adapters, like those shown in FIGS. 4a and 4b.

It should be clear from the foregoing examples that target pads 110 and segments 120 may be constructed and joined together in a variety of ways. The examples shown are intended to be illustrative rather than limiting.

To be effective as a length reference, the PDR 100 is preferably easy to assemble properly, so that the distance between targets 112 is accurate to within design specifications. To this end, all connections between segments and between target pads and segments are preferably tight and straight. In addition, it is highly preferable to maintain precision over a wide range of temperature. Materials may thus be selected based on their having either low coefficients of thermal expansion, in which case thermal effects can be ignored, or based on their having known coefficients of thermal expansion, in which case corrections for expansion or contraction can be made based on measures of local temperature. Suitable materials with low coefficient of thermal expansion include carbon fiber, for example. Suitable materials with known coefficients of thermal expansion include steel and aluminum, for example.

In some examples, components may be coated with materials designed to avoid excessive heating when exposed to sunlight. For example, specialized paints may be used on segments 120 to prevent them from becoming significantly hotter than ambient air under strong sun loading. Such materials typically provide a solar reflective index (SRI) of at least 80% and a thermal emittance of at least 85%, for example, and may commonly be found in the roofing and thermal insulation industries. Examples of suitable materials include thermal paint, such as Cool Coat™ Thermal Defense Sealer, which is available from Rainguard Pro of Phoenix, Ariz.

Figure 9:
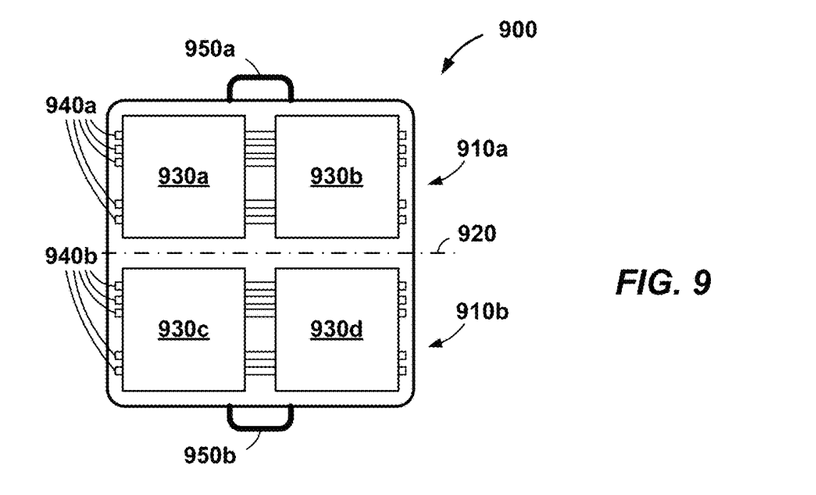
FIG. 9 is a top plan view of an example carrying bag that may be used for carrying components of one or more PDRs.

FIG. 9 shows an example carrying bag 900 that may be used for carrying components of the PDR 100 or of multiple PDRs. As shown, the carrying bag 900 includes two regions 910*a* and 910*b* for holding components for first and second PDRs 100, respectively. Line 920 designates a boundary between regions 910*a* and 910*b* and identifies a location at which the bag 900 may be folded in half.

The first region 910*a* includes compartments 930*a* and 930*b* for target pads 110 of the first PDR (i.e., first and second target pads), as well as areas 940*a* for holding an associated first set of segments 120 (five areas shown). The compartments 930*a* and 930*b* may be provided as stitched regions or the like for securely enveloping the first and second target pads, and the areas 940*a* may be provided as straps, stitched sleeves, or the like. The compartments may be zippered or secured in other ways, such as with hook-and-loop flaps. Preferably, the first region 910*a* includes all components needed to assemble the first PDR. Likewise, the second region 910*b* includes all components needed to assemble the second PDR. To this end, the second region 910*b* includes compartments 930*c* and 930*d* for holding target pads 110 (i.e., third and fourth target pads), as well as areas 940*b* for holding a second set of segments.

In the example shown, the region 910*a* includes a first handle portion 950*a* and the region 910*b* includes a second handle portion 950*b*. When the bag 900 is folded along the line 920, the first handle portion 950*a* comes together with the second handle portion 950*b* to form a handle of the carrying bag 900. A zipper or other fastener (not shown) may extend around the folded carrying bag 900 to securely contain its contents.

Figure 10:
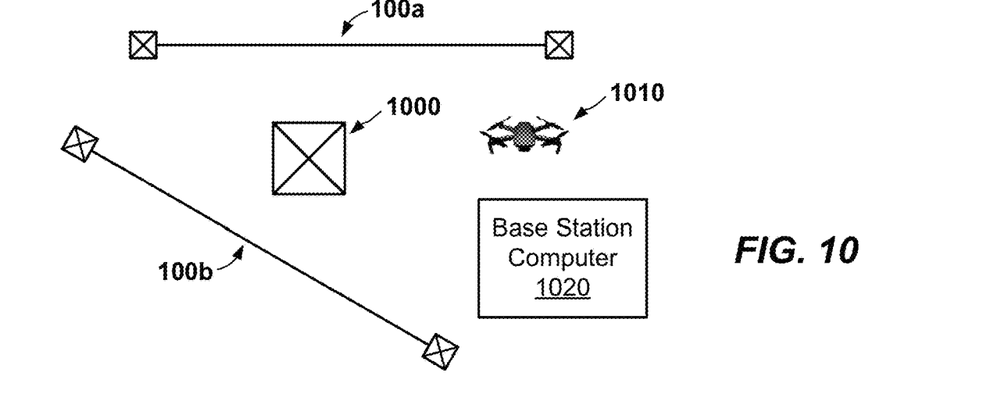
FIG. 10 is a schematic view of an example tower around which two PDRs are placed.

FIG. 10 shows an example arrangement for analyzing a tower 1000 using photogrammetry. As shown, two PDRs 100*a* and 100*b* are placed near the tower 1000, e.g., at ground level. Preferably, the PDRs 100*a* and 100*b* have identical lengths and are each placed within a predetermined distance, e.g., within 50 feet (15.24 meters) or within 100 feet (30.48 meters) of the tower 1000. A UAS (unmanned aerial system) 1010, such as a quadcopter drone, is equipped with one or more cameras. The UAS executes a flight pattern around the tower 1000 and obtains photographic images of the tower 1000 and its surroundings from different angles and different elevations. At least some of the photographic images include images of one or both PDRs.

In an example, a base station computer 1020 is disposed in communication with the UAS 1010 and receives the photographic images, e.g., via a wireless link. The base station computer 1020 may perform photogrammetric analysis of the photographic images of the tower 1000 using one or both PDRs as length references, e.g., by using the known lengths of the PDRs to scale computed lengths of various portions of the tower 1000.

Figure 11:
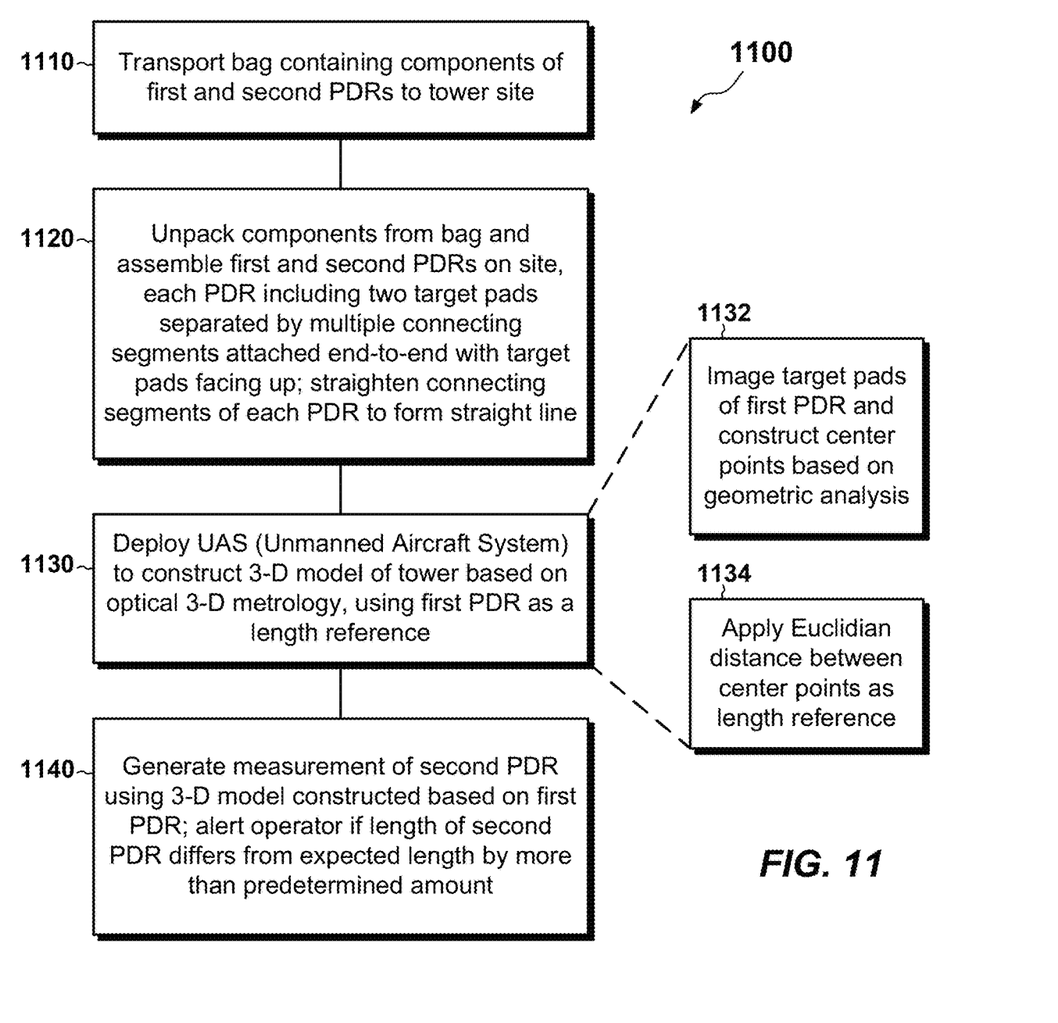
FIG. 11 is a flowchart showing an example method of using PDRs.

FIG. 11 shows an example method 1100 of using one or more PDRs 100. The method 1100 may be carried out, for example, by personnel and/or equipment at the site of a tower 1000.

At 1100, a carrying bag 900 is transported to the tower site. The carrying bag 900 contains components for first and second PDRs, e.g., a total of four target pads 110 and multiple connecting segments 120, such as ten connecting segments.

At 1120, the carrying bag 900 is unpacked and the first and second PDRs 100*a* and 100*b* are assembled. The PDRs are preferably placed at respective locations within a predetermined distance from the tower 1000 (e.g., within 50 feet (15.24 meters) or within 100 feet (30.48 meters), for example. Each PDR should preferably be straight, i.e., any curvature (either left-right or up-down) should be removed. Also, each PDR should preferably be arranged such that its target pads 110 are on the same plane. There is no requirement that the PDRs be level, however.

At 1130, a UAS 1010 is deployed to execute a flight path around the tower 1000. In an example, the UAS 1010 acquires photographic images of the tower 1000 and of the PDRs 100*a* and 100*b*. The UAS transmits the images to the base station computer 1020, which executes software to construct a 3-D model of the tower 1000. The model is based on optical 3-D metrology and uses the known length of the first PDR 100*a* as a length reference. For example, at 1132 the base station computer 1020 obtains images of the target pads 110 of the first PDR 100*a* and constructs reference points 610 of such target pads 110 using geometric analysis. At 1134 the software running on the base station computer 1020 computes a Euclidian distance between the reference points 610.

The computed distance may be based on dimensional assumptions, which may be roughly correct but still inaccurate. The software then proceeds to apply such computed distance as a length reference. For example, the software computes a correction factor between its estimate of the distance between reference points 610 of PDR 100*a* and the known distance between such reference points 610, e.g., 20 feet (6 meters). The software may then apply the correction factor to any metrologically computed lengths going forward.

At 1140, the base station computer 1020 measures the length of the second PDR 100*b* (e.g., the Euclidian distance between the reference points 610 of the second PDR 100*b*) using the correction factor determined based on the first PDR 100*a*. For example, the distance between the reference points 610 of the second PDR is not assumed to be known but rather is measured based on the known length of the first PDR 100*a*. Ideally, the measured distance between the reference points 610 of the second PDR, once corrected, should match the length reference to within a predetermined amount, such as 0.3%. If the two distances do not match, however, then an error in assembly may have occurred. In such a case, the base station computer 1020 may alert an operator that there is an error. The operator may then check the PDRs, to make sure all connections are tight and that the PDRs are straight. Any assembly errors can then be corrected.

An improved technique has been described for modeling towers 1000. The technique includes providing a portable dimensional reference (PDR) 100 that is transportable to a tower site and deployable on site at ground level near a tower 1000. The PDR 100 includes a pair of target pads 110 and multiple connecting segments 120, which may be attached end-to-end between the target pads 110. The target pads 110 are marked with respective targets 112 that enable photogrammetry software to identify the targets 112, their locations, and the distance between them with high precision, enabling the software to apply the known distance as a scale constraint for accurately scaling dimensions of imaged components of the tower 1000.

Having described certain embodiments, numerous alternative embodiments or variations can be made. Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

TABLE of Reference Numerals

| | |
|---|---|
| 100, 100a, 100b | Portable dimensional reference (PDR) |
| 110, 110a, 110b | Target pad(s) |
| 112, 112a, 112b | Targets |
| 120, 120a-120e | Connecting segments |
| 114 | Holes in target pad, for connecting to segment |
| 122 | Channel joiner for joining adjacent segments |
| 124 | Faster, such as bolt, rivet, or the like |
| 126 | Strap, such as 9-inch (22.9-cm) rubber tarp strap |
| 120x and 120y | Two adjacent segments |
| 310 | Plug used for joining adjacent segments (e.g., as an alternative to 122 and 124) |
| 310a and 310b | First and second portions of plug 310 |
| 312 | Receptacle |
| 320, 320a, 320b | Buckle latches used to connect connecting segments 120x and 120y |
| 410 | Male portion of push-and-lock connector for joining adjacent connecting segments (e.g., those having round cross-sections) |
| 412 | Locking post |
| 420 | Female portion of push-and-lock connector for joining adjacent connecting segments (e.g., those having round cross-sections) |
| 422 | Receptacle for receiving locking post 412 |
| 502 | Adapter for connecting target pad to segment |
| 510 | Slots for receiving strap 520 |
| 520 | Strap for securing connecting segment to target pad |
| 530 | Flat region of target pad |
| 530a | Turned-down edges of target pad, for securing and stabilizing contact with ground |
| 610 | Center of target pad, forming reference point |
| 620 | Feet of target pad |
| 820 | Alternative connecting segment (e.g., used with push-and-lock connector 410/420) |
| 900 | Carrying bag |
| 910a and 910b | Regions of carrying bag for respective PDRs |
| 920 | Line along which carrying bag may be folded |
| 930a-930d | Compartments of carrying bag configured to hold respective target pads |
| 940 | Areas for holding connecting segments, which may include straps and/or sleeves |
| 950a and 950b | First and second handle portions |
| 1000 | Tower |
| 1010 | UAS (e.g., quadcopter drone) equipped with photographic equipment for performing aerial digital photogrammetry |
| 1020 | Base station computer (configured to run photogrammetry software and communicate with UAS 1010) |

What is claimed is:

1. A method of using one or more portable dimensional references (PDRs), the method comprising:
transporting a carrying bag to a location of a tower, the carrying bag including components of a PDR, the components including a first target pad having a first target formed thereon, a second target pad having a second target formed thereon, and a set of multiple connecting segments configured to connect end-to-end between the first target pad and the second target pad to establish a known distance between the first target and the second target;
removing the components of the PDR from the carrying bag at the location of the tower;

assembling the PDR at least in part by attaching the connecting segments of the set of connecting segments end-to-end between the first target pad and the second target pad at a location within a predetermined distance from the tower; and performing photogrammetric measurements on the tower based at least in part on the known distance established by the PDR.

2. The method of claim 1, wherein the PDR is a first PDR and transporting the carrying bag to the location of the tower includes transporting components of a second PDR, the components of the second PDR including a third target pad having a third target formed thereon, a fourth target pad having a fourth target formed thereon, and a second set of multiple connecting segments configured to connect end-to-end between the third target pad and the fourth target pad to establish a known distance between the third target and the fourth target.

3. The method of claim 2, further comprising:
removing the components of the second PDR from the carrying bag;
assembling the second PDR at a second location within a predetermined distance from the tower by attaching the connecting segments of the second set of connecting segments end-to-end between the third target pad and the fourth target pad;
establishing a length reference based on photogrammetric images of the known distance between the first target and the second target;
photogrammetrically measuring, based on the length reference, a distance between the third target and the fourth target; and
alerting an operator of an error in assembling at least one of the first PDR and the second PDR responsive to detecting a mismatch between the measured distance and the known distance.

4. The method of claim 3, wherein photogrammetrically measuring the distance between the third target and the fourth target is performed by a computer based on photographic images acquired by a camera of an unmanned aerial vehicle that flies around the tower.

5. The method of claim 1, wherein assembling the PDR includes straightening the PDR so that the first target pad, the first set of connecting segments, and the second target pad all form a line on a common plane.

* * * * *